United States Patent
Sridhara et al.

(10) Patent No.: US 9,837,115 B1
(45) Date of Patent: Dec. 5, 2017

(54) UNEQUAL ERROR CORRECTION CODE IN MULTI-TRACK RECORDING

(71) Applicant: Seagate Technology LLC, Cupertino, CA (US)

(72) Inventors: Deepak Sridhara, Longmont, CO (US); William M Radich, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/339,189

(22) Filed: Oct. 31, 2016

(51) Int. Cl.
  *G11B 5/09* (2006.01)
  *G11B 20/10* (2006.01)
  *G11B 20/24* (2006.01)

(52) U.S. Cl.
  CPC ......... *G11B 20/10212* (2013.01); *G11B 5/09* (2013.01); *G11B 20/24* (2013.01)

(58) Field of Classification Search
  CPC ....... G11B 2220/20; G11B 27/36; G11B 5/09; G11B 220/90; G11B 27/3027; G11B 5/012
  USPC .............. 360/45, 48, 31, 55, 75, 126, 77.04; 369/275.1, 275.2
  See application file for complete search history.

(56) References Cited

U.S. PATENT DOCUMENTS

| | | |
|---|---|---|
| 4,908,826 A | 3/1990 | Hertrich |
| 5,487,077 A | 1/1996 | Hassner |
| 6,631,492 B2 | 10/2003 | Marchant |
| 7,253,986 B2 | 8/2007 | Berman |
| 8,699,162 B1 * | 4/2014 | Grobis .............. G11B 5/09 360/45 |
| 9,059,737 B2 | 6/2015 | Coker |
| 9,123,356 B2 | 9/2015 | Sankaranarayanan |
| 2016/0148625 A1 | 5/2016 | Zhu |

* cited by examiner

*Primary Examiner* — Nabil Hindi
(74) *Attorney, Agent, or Firm* — Cesari & Reed, LLP; Kirk A. Cesari; Christian W. Best

(57) ABSTRACT

Systems and methods are disclosed for implementing unequal error correction code (ECC) in multi-track recording. A device may comprise a circuit configured to implement an error correction coding scheme applying different code rate error correction codes on adjacent tracks within a same recording zone. The circuit may perform a read operation, including simultaneously detecting bits from a first track and a second track of the adjacent tracks, iteratively applying detected bits from the first track to perform adjacent track interference cancellation (ATIC) to decode bits from the second track, and iteratively applying detected bits from the second track to perform ATIC to decode bits from the first track.

20 Claims, 7 Drawing Sheets

UNEQUAL ERROR CORRECTION CODE IN MULTI-TRACK RECORDING

SUMMARY

In certain embodiments, a device may comprise a circuit configured to implement an error correction coding scheme applying different code rate error correction codes (ECCs) on adjacent tracks within a same recording zone.

In certain embodiments, a method may comprise implementing an error correction coding scheme applying different code rate error correction codes (ECCs) on adjacent tracks within a same recording zone of a data storage device.

In certain embodiments, an device may comprise a plurality of read heads configured to read a first track and a second track from the same recording zone simultaneously, the first track including data encoded with a first code rate error correction code (ECC), and the second track adjacent to the first track including data encoded with a second code rate ECC. The device may further comprise a first adjacent track interference cancellation (ATIC) circuit configured to receive sample values for the first track from the plurality of read heads, receive bit values corresponding to data from the second track, and iteratively perform ATIC on the sample values for the first track based on the bit values from the second track.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
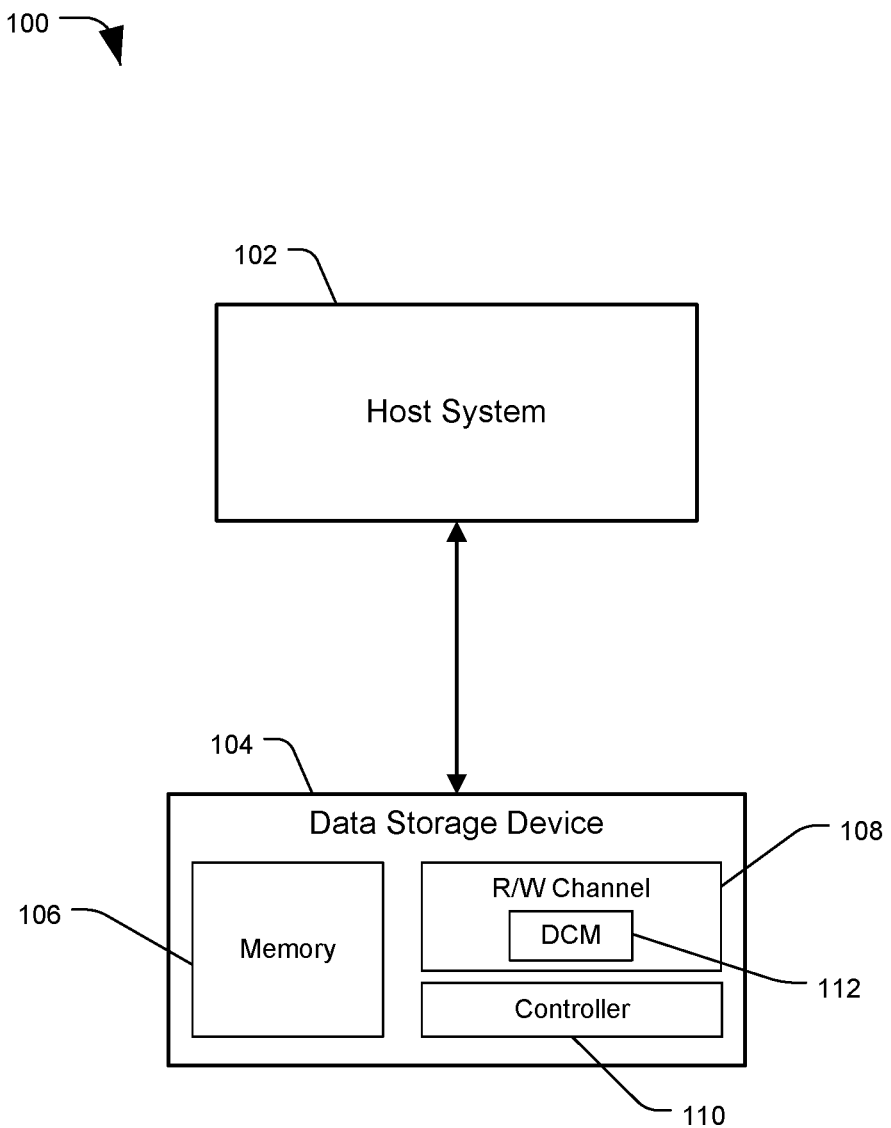
FIG. 1 is a diagram of a system configured to implement unequal error correction code (ECC) in multi-track recording, in accordance with certain embodiments of the present disclosure.

FIG. 1 is a diagram of a system, generally designated 100, configured to implement unequal error correction code (ECC) in multi-track recording, in accordance with certain embodiments of the present disclosure. The system 100 may include a data storage device (DSD) 104, such as a storage drive (e.g. a hard disc drive (HDD) or hybrid drive) or any other device which may be used to store or retrieve data. The system 100 may optionally include a host device 102, which may also be referred to as the host system or host computer. The host 102 can be a desktop computer, a laptop computer, a workstation, a tablet computer, a telephone, a music player, another electronic device, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive). The host 102 may issue data access requests, such as read or write requests, to the DSD 104. In response, the DSD 104 may perform data access operations based on the requests.

The DSD 104 may include a memory 106, a read/write (R/W) channel 108, and a controller 110. The memory 106 may comprise one or more data storage mediums, such as magnetic storage media like hard discs, solid state memory like Flash, other types of memory, or a combination thereof. The R/W channel 108 may be a digital communications channel comprising one or more circuits or processors configured to process signals for recording data to or reading data from the memory 106. The controller 110 may be a processor or circuit configured to perform data access operations, such as reads or writes, to the memory 106. Data retrieved from the memory 106, or to be stored to the memory 106, may be processed via the R/W channel 108, such as by encoding or decoding signals, detecting values from signal waveforms, or other processing.

The DSD 104 may be configured for multi-track recording. Multi-track recording may refer to a data storage and retrieval process whereby a DSD is configured to read multiple tracks together. For example, multi-track recording can refer to a write process where the data written to multiple adjacent tracks may be related (e.g. sector data is split in half between top and bottom tracks, so that the first half of a sector is on a first track and the second half of a sector is on a second track, and both tracks are read to retrieve the data sector), or some data from track 2 has some correlation with data on track 1, etc. Similarly, multi-track recording may refer to a read process that includes reading multiple tracks simultaneously, and employing signal processing and decoding schemes that can take advantage of multiple signals from the read. For example, multi-track recording may include applying coding diversity that uses different ECC for the top and bottom tracks, and leveraging the diversity to improve adjacent track interference cancellation and signal detection for each track. Multi-track recording may refer to any data storage approach where there is more than one track involved either during standard writes or reads (e.g. not only during error correction operations), and the drive employs an algorithm (e.g. detection, decoding, encoding, etc.) that takes advantage of the multiple tracks during the operations.

When writing data to or reading data from a memory 106, errors may arise that distort the actual data bits. Accordingly, prior to recording data to the memory 106, the data may be encoded using a selected ECC scheme, and parity bits may be generated and stored with the data. For example, systematic ECCs may preserve the data bits and merely generate parity bits, while non-systematic ECCs may modify the data bits into a new bit sequence that may be a different length than the input sequence. Blocks of data (e.g. a sequence of host data bits and parity bits) so encoded may be referred to as codewords. When the data is later read from the memory 106, the codeword may be decoded using the selected ECC scheme. The ECC scheme may allow the DSD 104 to correct a certain number of errors (e.g. a number of incorrect bits) in the codeword, based on the strength of the ECC scheme. For example, adding additional parity bits may allow the DSD to correct a greater number of errors at the expense of resulting in a larger codeword and requiring additional storage space.

Data may be encoded via more than one ECC scheme. For example, inner code (IC) may be used to encode a sector's worth of data, with parity bits stored with the sector. After reading the sector, the data and IC parity bits may be used to correct errors within the sector. In addition, multiple sectors' worth of data may be encoded with an outer code (OC) ECC scheme. OC parity data may be generated based on all the sectors in a track, for example. In order to use OC error correction, a DSD may read all the sectors of the track and OC parity sectors in order to correct failed sectors. Any given type of ECC encoding, e.g. IC encoding, may be applied using various different encoding schemes (e.g. convolution algorithms) that produce a different number of parity bits.

The DSD 104 may include a detection and coding module (DCM) 112, which may be included in the R/W channel 108, the controller 110, distributed among various components, or otherwise included in the DSD 106. The DCM 112 may manage the ECCs applied when encoding data for recording to the memory 106, or decoding data read from the memory 106.

The DCM 112 may also perform adjacent track interference (ATI) cancellation when attempting to detect and decode data bits. When reading data from a memory 106, the magnetic field of data on a track may be influenced by the field of data stored to adjacent tracks, resulting in ATI. This may be especially prevalent with high track density storage mediums, where a read head may be wider than a data track. The ATI can reduce the signal-to-noise rate (SNR) when reading a data track, resulting in read errors. The influence of the ATI can be reduced via ATI cancellation, for example by determining the data pattern of an adjacent track and removing or reducing the corresponding influence from the read data. This can improve the SNR for the read data and improve the DSD's ability to correctly detect bit values.

Exploiting SNR diversity (over space or over time) may be used to realize SNR gains in communication channels, including data storage channels. As an example, outer codes that are constructed over sectors in a track for HDD channels may be used to exploit the SNR diversity of sectors written and read in the downtrack direction.

Diversity across tracks may also be used to achieve SNR gains. Sectors may be encoded and written with different ECC schemes (e.g. different code rates) so that during decoding, once a sector in one of the tracks converges, that sector can help boost the SNR experienced by sectors on its adjacent tracks. The converged data may be used to improve the SNR of adjacent tracks via an iterative adjacent track interference canceller, or via a joint equalization and detection scheme such as multiple-input and multiple-output (MIMO). Different approaches may have different benefits. For example, the MIMO implementation may provide superior bit detection for multiple tracks than the iterative ATI canceller, but may also require bits in the adjacent tracks to be phase-aligned, adding complexity to the system. Decoding a sector on one track can aid the sector on the adjacent track to be decoded as well, leveraging the diversity between tracks. By using one or more read heads capable of reading multiple adjacent tracks simultaneously, performance advantages can be achieved without requiring multiple revolutions of an HDD. The proposed coding scheme is applicable to technologies using two-dimensional magnetic recording (TDMR), interleaved magnetic recording (IMR), or shingled magnetic recording (SMR) for recording on storage media. An example embodiment of system 100, including a more detailed diagram of DSD 104, is depicted in FIG. 2.

Figure 2:
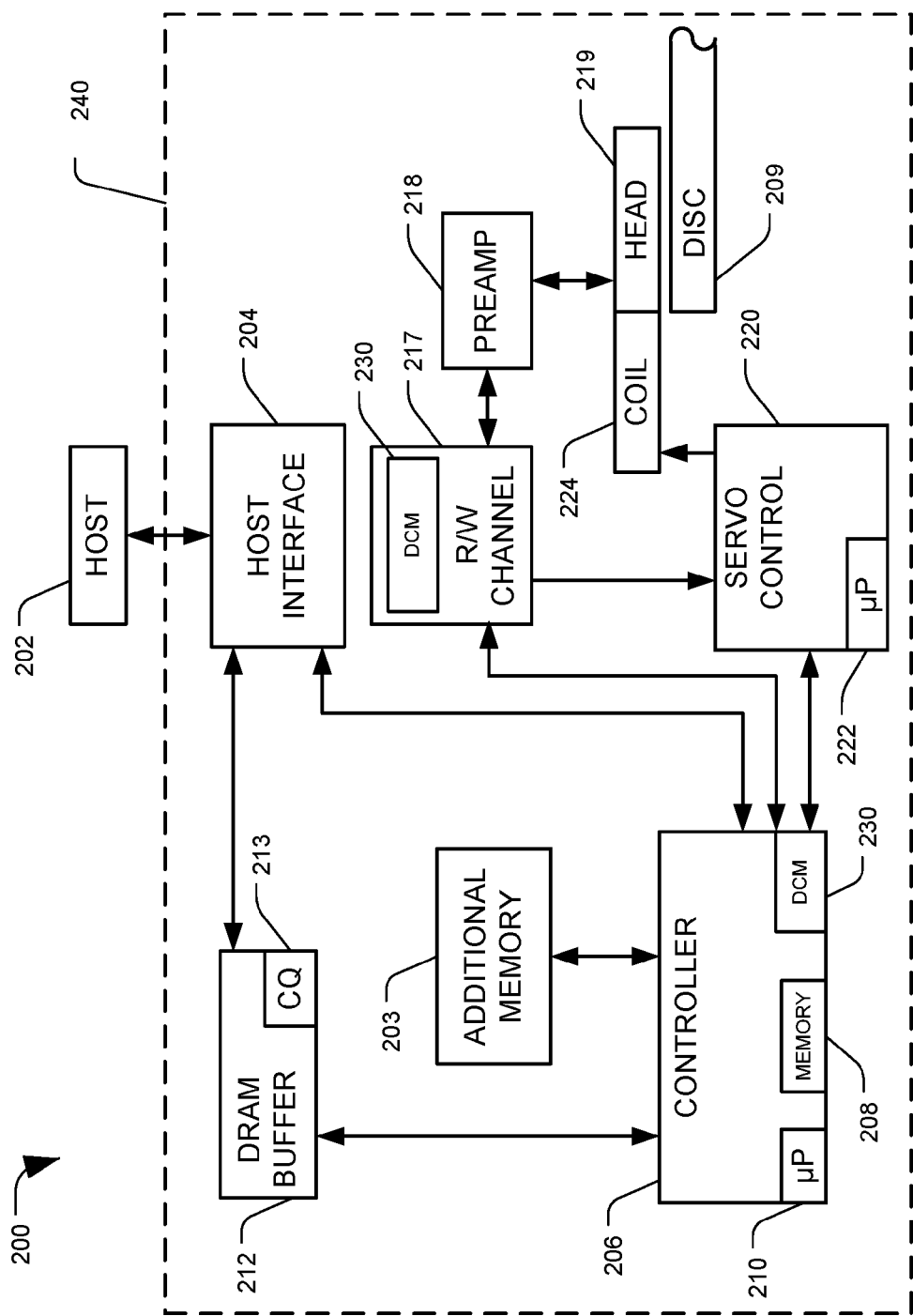
FIG. 2 is a diagram of a system configured to implement unequal ECC in multi-track recording, in accordance with certain embodiments of the present disclosure.

FIG. 2 is a diagram of a system 200 configured to implement unequal error correction code (ECC) in multi-track recording, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. The DSD 200 may have a casing 240 housing the components of the DSD 200. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller 206 may control data access operations, such as reads and writes, to one or more disc memories 209, or to additional memories 203. The DSD 200 may include the additional memory 203 instead of or in addition to disc memory 209. For example, additional memory 203 can be a solid state memory, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

The DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. In some embodiments, the preamp 218 and head(s) 219 may be considered part of the R/W channel 217. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

DSD 200 may include detection and coding module (DCM) 230. The DCM 230 may perform the methods and processes described herein to detect values when data is read, and manage data encoding and decoding operations. For example, the DCM 230 may apply different encoding schemes to data stored to adjacent tracks in order to promote cross-track diversity. The DCM 230 may also perform adjacent track interference cancellation operations using data read from adjacent tracks. The DCM 230 may exploit cross-track diversity from data encoded with different encoding schemes to realize SNR gains. The DCM 230 may be a processor, controller, or other circuit, or it may be a set of software instructions that, when executed by a processing device, perform the functions of the DCM 230. In some embodiments, the DCM 230 may be part of or executed by R/W channel 217, part of or executed by the controller 206, included in or performed by other components of the DSD 200, a stand-alone component, or any combination thereof. The operation of the DCM 230 and unequal error correction encoding in multi-track recording are discussed in further detail in regard to FIG. 3.

Figure 3:
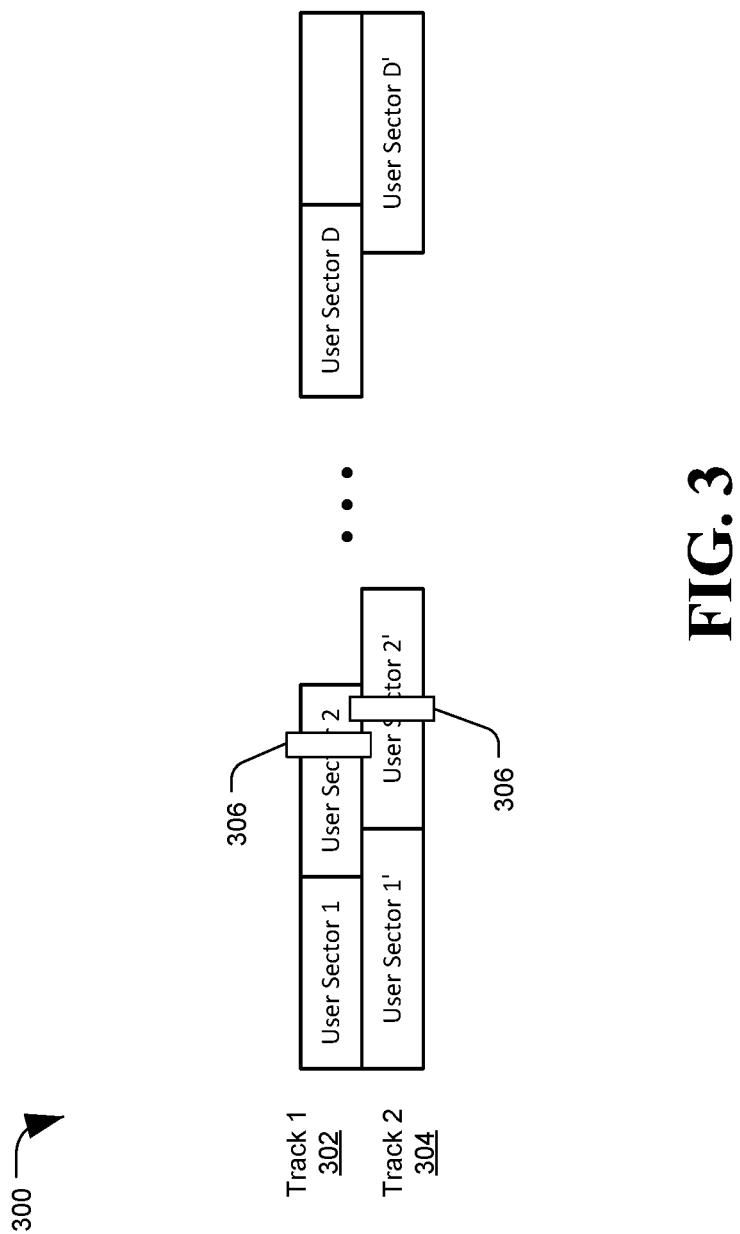
FIG. 3 is a diagram of a system configured to implement unequal ECC in multi-track recording, in accordance with certain embodiments of the present disclosure.

FIG. 3 is a diagram of a system configured to implement unequal ECC in multi-track recording, in accordance with certain embodiments of the present disclosure. In particular, FIG. 3 depicts an example set of tracks 300 of a data storage medium, such as a magnetic disc, with each track including a plurality data sectors storing user data.

The tracks 300 may include a track 1 302 and a track 2 304, each having a plurality of sectors. In some data storage implementations, tracks may be divided into data storage recording "zones." A zone may be a large group of contiguous tracks, such that a hard disc may be divided into a plurality concentric zones, each zone having a plurality of tracks. Tracks within a zone may have sectors of approximately the same size (e.g. data capacity and physical sector size on the storage media). The same ECC scheme may be used for each sector or codeword within a zone, so that each has the same amount of user or host data, and the same amount of parity data. A single read head, or multiple heads in multi-sensor magnetic recording (MSMR), may be used to read a single target track. There may be no interaction with adjacent tracks except during adjacent track interference cancellation (ATIC) that may be used during error recovery, and may require additional media revolutions to obtain information from the adjacent tracks. While simple, such an example implementation may require multiple revolutions for ATIC operations and may present little cross-track diversity.

An alternative embodiment is presented in FIG. 3. Track 1 302 track 2 304 may be within the same zone, and may be written independently with a single recording head. However, sectors on adjacent tracks, such as track 1 302 and track 2 304, may be encoded with different code rate ECC schemes, resulting in cross-track diversity. Furthermore, the multiple tracks may be recorded at different channel bit densities (CBDs) as used for certain technologies such as IMR. The DSD, for example via the DCM, may be configured to apply a plurality (e.g. four) different ECC encoding schemes, for use in encoding and decoding data of various tracks and zones. For example, tracks in zone 1 may alternate between a first and a second encoding scheme, tracks in zone 2 may alternate between the second and a third encoding scheme, and tracks in zone 4 may alternate between the third and a fourth encoding scheme. Alternately, the tracks in each zone may cycle through four encoding schemes (e.g. track 1 is encoded with ECC scheme 1, track 2 is encoded with ECC scheme 2, track 3 is encoded with ECC scheme 3, etc.). The DSD may maintain a lookup table (LUT) identifying which ECC scheme, bit density, or other recording and encoding metrics are used for each track. This LUT may be loaded into a memory during operation to know what parameters to apply when recording or reading data from a target location.

In the depicted embodiment, an unequal parity coding scheme may be applied for the different tracks, but with a constant host sector size (e.g. amount of user data bits per sector). For example, the parity coding scheme for track 1 302 may produce fewer parity bits than the coding scheme for track 2 304, and accordingly the total sector size on track 1 302 may be smaller than the sector size on track 2 304. Therefore, user sector 1 of track 1 302 appears shorter than user sector 1' of track 2 304 (e.g. having fewer bits, occupying a smaller physical media sector size, or both).

Because the tracks are written independently, each track may similarly comprise a distinct OC parity block, with OC parity sectors generated and stored for each track independently. Adjacent tracks may use different OC parity schemes, or the same OC parity scheme.

Dual or multiple readers 306 may be used to read data from both tracks simultaneously. Both read heads 306 may be located on a single slider or arm of the HDD, but may be positioned over different tracks, e.g. due to a high track density. The magnetic fields read from each track may be processed by multiple SISO (single input single output) detectors, or by a common MISO (multiple input single output) or MIMO (multiple input multiple output) detector.

The data read from each track may be used to perform ATIC on the adjacent track. During decoding, once a sector in one of the tracks converges (producing reliable bit value results), that sector can help boost the SNR experienced by the sector(s) on its adjacent track(s) via an iterative adjacent track interference canceller (or a joint equalization and detection scheme such as MIMO). Performing iterative ATIC while reading adjacent tracks simultaneously can improve SNR even if both tracks are recorded using the same ECC code rate, producing the same number of ECC parity bits per sector. By recording the sectors on the adjacent tracks at different code rates, a likelihood of a sector from one track (e.g. user sector 1') converging before an adjacent sector may be further improved, and the converged sector's information may be used for ATIC to greatly improve the ability to detect and decode the bits of the adjacent sector. During a single disc revolution, the read channel may iteratively attempt to decode the read sectors multiple times, improving the likelihood of correctly detecting and decoding the bit values with each iteration and application of ATIC. Due to the application of dual readers to read multiple tracks simultaneously, there may be no need to perform additional disc revolutions to obtain information to perform ATIC.

Generating a full ATIC signal for use in decoding a target sector may include decoding all sectors aligned with the target sector on the adjacent track. For example, generating a full ATIC signal for user sector 2 may include decoding user sector 1' and user sector 2' from the adjacent track. A partial ATIC signal may be generated based on a single sector if both adjacent sectors have not been decoded. Once a sector is decoded, its information may be buffered for use in generating an ATIC signal for another sector (e.g. if the decoded sector is aligned with more than on sector on the adjacent track. Another embodiment of unequal ECC in multi-track recording is addressed in regard to FIG. 4.

Figure 4:
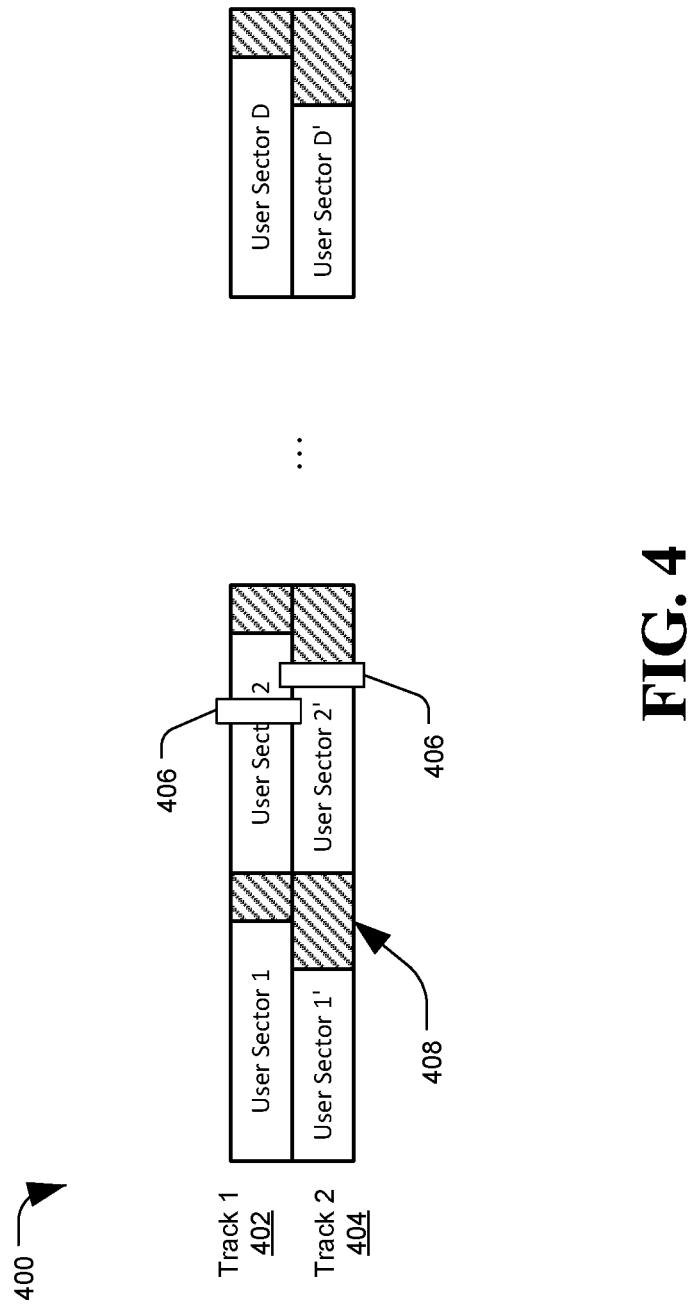
FIG. 4 is a diagram of a system configured to implement unequal ECC in multi-track recording, in accordance with certain embodiments of the present disclosure.

FIG. 4 is a diagram of a system configured to implement unequal ECC in multi-track recording, in accordance with certain embodiments of the present disclosure. In particular, FIG. 4 depicts another example set of adjacent tracks 400 of a data storage medium, including track 1 402 and track 2 404. As in FIG. 3, the adjacent tracks may be read simultaneously using a dual or multiple reader 406.

In the depicted embodiment, the sectors on the adjacent tracks may have a constant media sector size while still employing unequal parity coding schemes. For example, an amount of parity data of each sector may be represented by the shaded blocks 408. While user sector 1 and use sector 1' both have the same media sector size, user sector 1 may have more user or host data and less parity data than user sector 1'. For example, a host may have two sector sizes corresponding to the different user data capacities of sectors on different tracks. Alternately, there may be a single host sector size, e.g. corresponding to a logical block address (LBA), and the DSD may decide how to organize the data in a manner transparent to the host. For example, multiple host sectors may be combined into a single media sector (e.g. ten host sectors may be combined for media sectors on track 1 402, while eight host sectors may be combined for media sectors on track 2 404), or a single host sector may be divided into multiple media sectors (e.g. media sectors on track 1 402 include half of a host sector, while media sectors on track 2 404 include one third of a host sector). Once again, the implementation presented in FIG. 4 provides cross-track diversity that may result in the data from one track converging before the other track, providing improved ATIC performance and realizing SNR gains. A system for performing the iterative ATIC detection and decoding is described in regard to FIG. 5.

Figure 5:
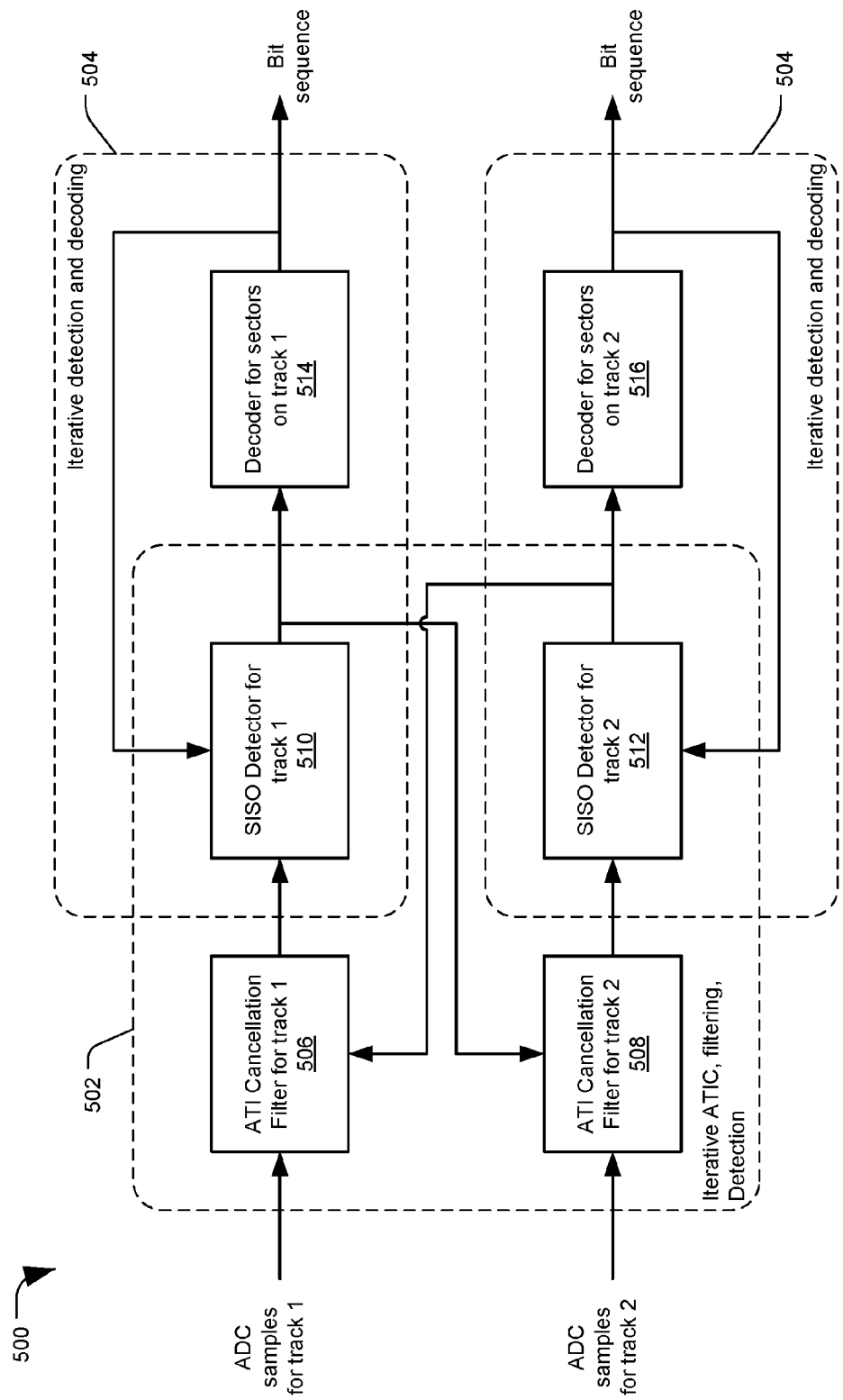
FIG. 5 is a diagram of a system configured to implement unequal ECC in multi-track recording, in accordance with certain embodiments of the present disclosure.

FIG. 5 is a diagram of a system 500 configured to implement unequal ECC in multi-track recording, in accordance with certain embodiments of the present disclosure. In particular, FIG. 5 depicts an example iterative ATIC block which may be used to process the signals from simultaneously read adjacent tracks. The depicted system 500 may be part of a R/W channel of a DSD such as the one depicted in FIG. 2. The system 500 may be part of or controlled by the detection and coding module (DCM).

System 500 may include a data path for processing signals for each track read simultaneously. The first path, for track 1, may include an ATI cancellation and equalization filter 506, a SISO detector 510, and a decoder 514. Similarly, the second path may include the same components of an ATI cancellation and equalization filter 508, SISO detector 512, and decoder 516. In some implementations, some or all of the components may be combined across the two paths, such as using MISO or MIMO detectors instead of the SISO detectors. The ATIC and equalization filters, the detectors, and the decoders may be individual circuits, or combined into one or more circuits.

The processing for each path may be described by reference to the first path for illustration. When a signal is read from the storage medium via a read head, it may be provided to an analog to digital converter (ADC), which may sample the signal waveform at intervals to obtain sample values. These sample values may be provided to the ATI cancellation and equalization filter 506. The filter 506 may reverse or reduce distortions in the signal or sample values, for example by performing ATIC operations. When the ADC samples are first received, the ATI cancellation filter may not have sufficient information from the adjacent track to perform ATI cancellation, but may still perform signal equalization operations. For example, on a first pass the ATI cancellation filter may apply a default ATIC cancellation signal of all 0s, or simply pass the data to the next block without modification. The equalized sample values may be provided to the SISO detector 510, which may determine the bit sequence provided by the signal based on the sampled values from the ADC (e.g. whether the sample values indicate a 1 or a 0). The detected bit stream may be passed to a decoder 514, which may decode the bit stream into usable data using the ECC scheme for the target track. For example, the data in the signal may be encoded with an error correction code, and the decoder 514 may attempt to determine and correct errors in the detected bits based on the error correction code. The decoder 514 may output a bit sequence of decoded and error-corrected bits, representing the data encoded within the signal.

Each decoder may be configured to apply a different ECC scheme, based on the parity code used to encode the track being read. For example, the decoder 514 for track 1 may decode the bit string using a first ECC scheme used to encode the data on track 1, while the decoder 516 for track 2 may decode its own bit string using a second ECC scheme used to encode track 2. The unequal ECC schemes used on the adjacent tracks may increase the likelihood of one of the tracks converging before the other, and that converged data can be used to improve the detection and decoding for the adjacent track via ATI cancellation.

The system 500 may accordingly perform iterative operations to attempt to improve the ATIC filtering, the detection, and decoding in case a codeword or sector fails to properly decode the first time. The channel may be able to attempt multiple iterated decoding attempts for each sector before recovery of the sector must be deferred in order to process the next sector, or before the sector is determined to have failed and error recovery operations are required. The iterative operations may include iterative detection and decoding 504, which may iterate within a single track's data path. Another iterative operation may include iterative ATIC, filtering, and detection 502, which may include iteratively providing information between the two data paths.

The iterative detection and decoding 504 may be between a decoder 514 and detector 510 on the same data path. The detector may provide the decoder with, in addition to the bit sequence, a confidence or probability rating for the bits. The detector may estimate the likelihood or confidence that the determination of "1" or "0" for each bit is accurate, based on the sample values from which the determination was made and various other parameters. Bit values and the corresponding likelihood or confidence information may be referred to as "soft" values or information, as compared to hard values where a sequence of bits is provided without likelihood estimates. The decoder 514 may use the confidence ratings while attempting to decode the bit sequence. For example, if the bit sequence fails to decode, the decoder 514 may try again after inverting a value of one or more bits with the lowest confidence ratings. Based on the results of the decoding operations, the decoder 514 may provide feedback to the detector 510. If the sequence fails to decode, the decoder 514 may make a determination of the likely value of various bits based on the decoding operations, and may provide a different likely bit string with corresponding likelihood information to the detector 510. As an example, low-density parity check (LDPC) ECC may be a probability-based decoding scheme (e.g. capable of correcting 800 bits 99% of the time, 900 bits 80% of the time, etc.), and the decoder may be able to determine estimates even if all errors in the codeword are not successfully decoded. If the bit sequence does successfully decode, the decoder 514 may provide the correct bit string directly to the ATI cancellation filter 508 for the adjacent track, or may provide the bit string to the detector 510, which in turn may provide the decoded sector information to the ATI cancellation filter 508.

The iterative ATIC, filtering, and detection 502 may operate between the detector of one track and the ATI cancellation and equalization filter of the adjacent track. When the detector 510 of track 1 determines estimated bit values, the detector 510 may provide the bit value information to the ATI cancellation and equalization filter 508 of track 2. The ATI cancellation filter 508 for track 2 may use the estimated bit values from track 1 to generate a cancellation signal to perform ATI cancellation on the track 2 data, improving the SNR of the equalized sample values. The ATI cancellation filter 508 may provide the improved or updated sample values to the detector 512 for track 2 each time a new round of ATI cancellation is performed. The ATI cancellation operations may improve the likelihood of the detector 512 for track 2 detecting correct bit values from the sample values. The detector for each track may provide the ATI cancellation filter for the adjacent track with bit values each time bit values are estimated. For example, the detector may iteratively provide bit values after first detecting bits from the sample values, as well as when updated bit values are determined based on iterative feedback from the decoder or updated sample values from the ATI cancellation filter. The described iterative processes may continually improve the DSDs capability to correctly detect and decode codewords or sectors. An example method of applying unequal ECC in multi-track recording is discussed in regard to FIG. 6.

Figure 6:
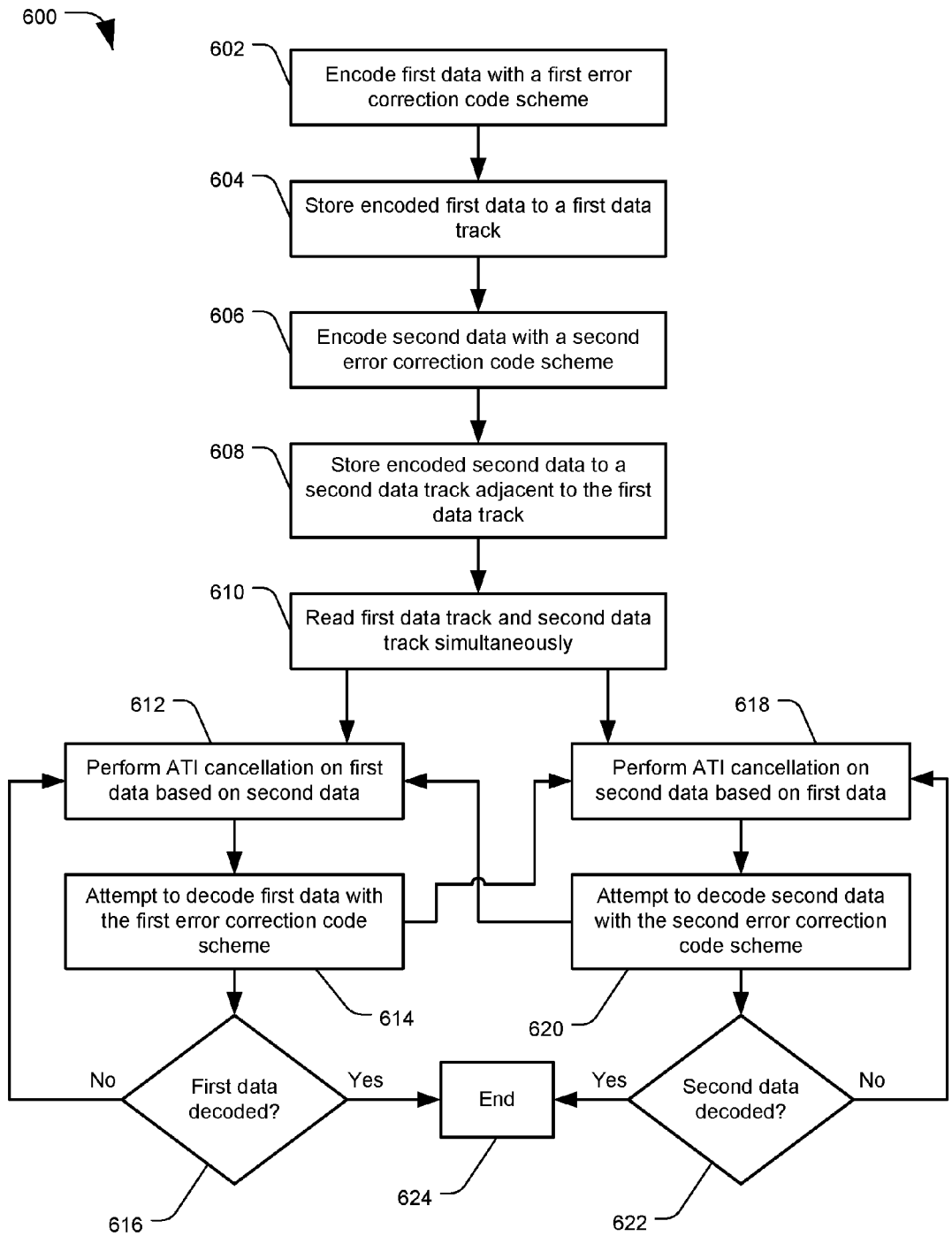
FIG. 6 is a flowchart of a method of applying unequal ECC in multi-track recording, in accordance with certain embodiments of the present disclosure.

FIG. 6 is a flowchart of an example method 600 of applying unequal ECC in multi-track recording, in accordance with certain embodiments of the present disclosure. The method 600 may be performed by one or more components of a data storage device (DSD), such as an detection and coding module (DCM).

The method 600 may include writing data using different code rate ECC codes to adjacent tracks, and then reading the data back. At 602, the method 600 may include encoding first data with first error correction code scheme. At 604, the method 600 may include storing the encoded first data to a first data track. For example, the target track may be track 10, which may be associated with ECC scheme 1 that produces a first number of parity bits for each sector.

Method 600 includes encoding second data with a second error correction code scheme, at 606. The encoded second data may be stored to a second data track adjacent to the first data track, at 608. For example, the target track may be track 11, which may be associated with ECC scheme 2 that produces a second number of parity bits for each sector. The sectors on the first track and the second track may be the same size (e.g. 512 megabits, where sectors on the first track have more user data and less parity bits than sectors on the second track). Alternately, the sectors on the first and second tracks may be different sizes (e.g. sectors on both tracks contain the same amount of user data, but different amounts of parity bits). Other ECC variations between adjacent tracks are also possible.

Method 600 may next including reading data from the first track and second track simultaneously, at 610. For example, a first reader and a second reader may be positioned over the first track and the second track, respectively, during a read operation. The read data from each track may be processed independently, as represented by the branching method paths 612 and 618. The first data from the first data track may be processed via the method path starting with 612, with the second data from the second data track may be processed via the method path starting with 618. Both paths may be performed concurrently, and each path may iteratively interact with the other path.

At 612, the method 600 may include performing ATI cancellation on the first data based on the second data from the second track. The ATI cancellation may be performed on a first processing attempt of the first data, or on an iterated subsequent attempt if the first decoding attempt fails.

The method 600 may then include attempting to decode the first data with the first error correction code scheme, at 614. This may include detecting bit values from waveform sample values of the first data, and then applying the first ECC scheme to the bit values and correcting errors (e.g. incorrect bits). Information on the detected or decoded bit values may be provided to the ATI cancellation block for the second track.

At 616, a determination may be made whether the first data was decoded. If not, the method 600 may iterate by returning to 612 and continuing to attempt filtering, detection, and decoding operations. Information may be provided from a decoder to a detector for the first track based on attempts to decode the first data, potentially improving the detector's performance on a subsequent iteration or providing information on the first data that may then be provided to the ATI cancellation block for the second track. If the first data is successfully decoded, at 616, the 612 branch of the method 600 may end, at 624.

The second data for the second data track is processed similarly. At 618, the method 600 may include performing ATI cancellation on the second data based on information about the first data, at 618. The information about the first data may be provided by components of a processing path for the first data, such as a detector or decoder. The method 600 may include attempting to decode the second data with the second ECC scheme, at 620, and providing information about the second data to the ATI cancellation block of the first data. A determination may be made whether the second data was decoded, at 622. If not, the method 600 may iterate to 618 to attempt additional ATIC, detection, and decoding. If the second data was decoded, the 618 branch of the method may end, at 624.

In some embodiments, a DSD may need data from only one of the first track or the second track, such as in response to a host read request. For example, the host may request a sequence of LBAs stored to the first track. Data may be simultaneously read and processed from the first and second track simultaneously to improve the DSD's capability to retrieve the requested data. If the first data from the first track converges and is decoded successfully before the second data is decoded, the method 600 may end prior to decoding the second data. Since the second data was not requested and was not needed to decode the first data, the DSD may not need to devote additional operations to decoding the second data.

Figure 7:
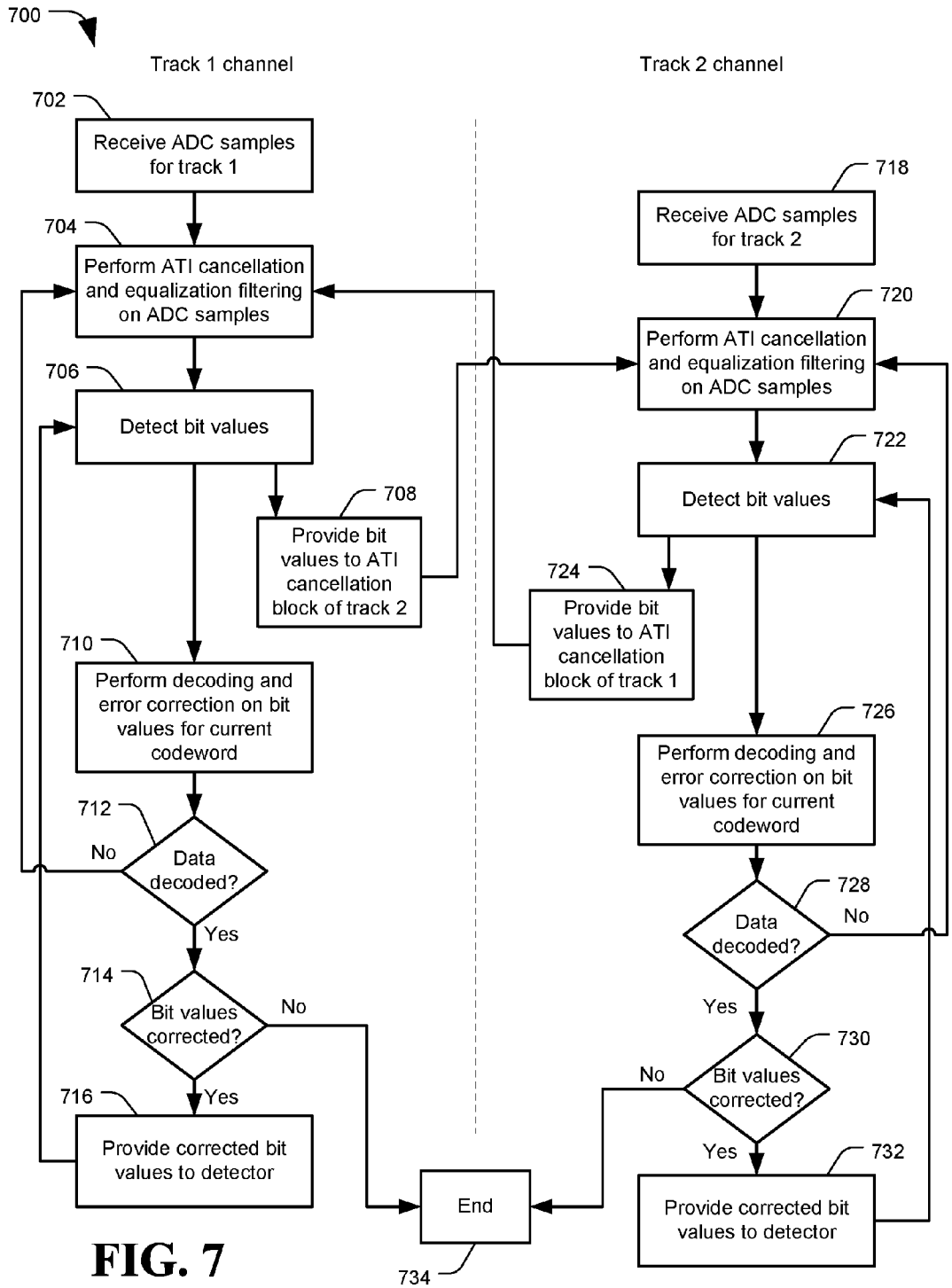
FIG. 7 is a flowchart of a method of applying unequal ECC in multi-track recording, in accordance with certain embodiments of the present disclosure.

Turning now to FIG. 7, a flowchart of an example method 700 of applying unequal ECC in multi-track recording is shown, in accordance with certain embodiments of the present disclosure. The method 700 may be performed by one or more components of a data storage device (DSD), such as an detection and coding module (DCM) or iterative ATIC block of FIG. 5. The method 700 may be divided into a track 1 channel for processing data read from a first track, and a track 2 channel for processing data read from a second track adjacent to the first track. As the operations performed by the track 1 channel and the track 2 channel may be largely the same, the steps of both tracks will be discussed together except where the details diverge.

The method 700 may include receiving samples from an analog to digital converter (ADC), at 702 and 718. Sampling a signal at the ADC may include converting a continuous physical quantity (e.g. voltage) of the signal into a digital number or value representing the quantity's amplitude. The method 700 may include performing ATI cancellation and equalization filtering on the ADC samples, at 704 and 720. The track 1 channel may perform ATIC based on data provided by the track 2 channel, and the track 2 channel may perform ATIC based on data provided by the track 1 channel. For example, each track channel may provide the other track channel information that may be used to cancel or reduce the influence of adjacent track interference. The information provided to the other track may be updated or improved as the DSD iteratively attempts to detect and decode bit values from the sample values, and therefore the ATIC performed by each channel may improve with continued iterations.

The method 700 may include detecting bit values from the samples, at 706 and 722. Bit value estimates may be made based on the digital values of the samples provided by the ADC and filtered by the ATIC block. The bit values may be provided to the ATIC block of the other channel, at 708 and 724. Soft information on the confidence or likelihood of the bit values may also be provided. The ATIC block of the other channel may use the bit values and confidence information to perform ATIC on subsequent iterations of data processing.

The bit values and soft information from the detector may also be provided to a decoder, where the method 700 includes performing decoding and error correction on the bit values for the current codeword, at 710 and 726. For example, the detector may provide bit values as each new symbol or sample is evaluated, along with the likelihood the bit value is correct, and the decoder may accumulate the number of bits corresponding to a codeword of the relevant ECC scheme. Each sector or codeword may have a selected number of bits, and properly decoding the codeword may require accumulating a bit string of all of the bits of a codeword, and then decoding the bit string using the ECC scheme used to encode data of the corresponding track. The decoder may be configured to correct a number of errors in the bit string up to a ECC capability of the parity code scheme used. For example, the more parity bits generated by the applied ECC, the more errors that may be corrected by the decoder. The decoder may also use soft information from the decoder to attempt the decode the codeword, such as by inverting low-quality bits and attempting to decode again.

A determination may be made whether the data was successfully decoded, at 712 and 728. If not, the method 700 may include iteratively returning to 704 and 720, to attempt additional ATIC, detection, and decoding operations. Further, the decoder may determine and provide information (e.g. estimated bit values and likelihood or confidence information) to the detector from which the detector may make improved estimates on the bit values. If the data was successfully decoded, at 712 or 728, the method 700 may include determining whether any bit values provided by the detector were corrected by the decoder, at 714 and 730.

If bit values were corrected, the method 700 may include providing bit accuracy information, such as corrected bit values, to the detector, at 716 and 732, and returning to 706 and 722, where the detector may provide updated information to the ATIC block of the other channel. The decoder may also or alternately provide information (e.g. the successfully decoded bit sequence) directly to the other channel after successfully decoding information.

If bit values were not corrected by the decoder, then it may be assumed that the detector determined the correct bit values without error, and provided reliable information to the other channel. Accordingly, the method for the particular channel may end, at 734. Optionally, the method 700 may include the decoder or detector providing information to the other channel even if no bit values had to be corrected.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a data storage medium having multiple recording zones, each recording zone having a contiguous set of tracks for storing data; and
   a circuit configured to implement an error correction coding scheme applying different code rate error correction codes (ECCs) on adjacent tracks within a same recording zone.

2. The device of claim 1 comprising the circuit further configured to:
   perform a read operation, including:
      simultaneously detect bits from a first track and a second track of the adjacent tracks; and
      iteratively apply detected bits from the first track to perform adjacent track interference cancellation to decode bits from the second track.

3. The device of claim 2 further comprising:
the read operation further including:
iteratively apply detected bits from the second track to perform adjacent track interference cancellation to decode bits from the first track.

4. The device of claim 1 comprising the circuit further configured to:
store data to sectors of the adjacent tracks;
apply a first code rate ECC to data stored to a first track of the adjacent tracks, the first code rate ECC producing a first number of parity bits per sector; and
apply a second code rate ECC to data stored to a second track of the adjacent tracks, second code rate ECC producing a second number of parity bits per sector.

5. The device of claim 4 further comprising:
sectors on the first track and sectors on the second track include equal media sector size and an unequal amount of host data.

6. The device of claim 4 further comprising:
sectors on the first track and sectors on the second track include unequal media sector size and an equal amounts of host data.

7. The device of claim 1 comprising the circuit further configured to:
receive a read request for data stored to a first track of the adjacent tracks;
perform a read operation to simultaneously read data from the first track and a second track of the adjacent tracks;
generate a first adjacent track interference cancellation (ATIC) signal based on detected bits from the first track;
generate a second adjacent track interference cancellation (ATIC) signal based on detected bits from the second track;
perform ATIC on sample values for the first track based on the second ATIC signal to improve a signal to noise ratio (SNR) of the sample values for the first track; and
perform ATIC on sample values for the second track based on the second ATIC signal to improve a signal to noise ratio (SNR) of the sample values for the second track.

8. The device of claim 7 comprising the circuit further configured to:
access a lookup table (LUT) to determine a first ECC corresponding to the first track and a second ECC corresponding to the second track.

9. The device of claim 7 further comprising:
a plurality of read heads configured to read the first track and the second track simultaneously;
a data path for each track read simultaneously, a data path including:
an adjacent track interference cancellation (ATIC) block configured to perform ATIC on sample values from a corresponding track;
a detector configured to detect bit values from the sample values and provide the bit values and first confidence values for the bit values to the ATIC block of the adjacent track's data path; and
a decoder configured to decode the bit values and determine second confidence values for the bit values by applying an ECC associated with the corresponding track.

10. A method comprising:
implementing an error correction coding scheme applying different code rate error correction codes (ECCs) on adjacent tracks within a same recording zone of a data storage device.

11. The method of claim 10 further comprising:
performing a write operation, including:
encoding first data with a first ECC;
storing the first data to a first track of the adjacent tracks;
encoding second data with a second ECC; and
storing the second data to a second track adjacent to the first track.

12. The method of claim 11 further comprising:
the write operation further including:
encoding the first data with the first ECC to produce a first number of parity bits per sector;
encoding the second data with the second ECC to produce a second number of parity bits per sector; and
storing the first data and the second data to sectors of the adjacent tracks.

13. The method of claim 12 further comprising:
storing sectors on the first track to include equal media sector size and an unequal amount of host data from sectors on the second track.

14. The method of claim 12 further comprising:
storing sectors on the first track to include unequal media sector size and an equal amounts of host data from sectors on the second track.

15. The method of claim 11 further comprising:
performing a read operation, including:
simultaneously detecting bits from the first track and the second track of the adjacent tracks; and
iteratively applying detected bits from the first track to perform adjacent track interference cancellation on analog to digital converter (ADC) sample values from the second track.

16. The method of claim 15 further comprising:
the read operation further including:
iteratively applying detected bits from the second track to perform adjacent track interference cancellation on ADC sample values from the first track.

17. An apparatus comprising:
a plurality of read heads configured to read a first track and a second track from a same recording zone simultaneously,
the first track including data encoded with a first code rate error correction code (ECC);
the second track adjacent to the first track and including data encoded with a second code rate ECC; and
a first adjacent track interference cancellation (ATIC) circuit configured to:
receive sample values for the first track from the plurality of read heads;
receive bit values corresponding to data from the second track; and
iteratively perform ATIC on the sample values for the first track based on the bit values from the second track.

18. The apparatus of claim 17 further including:
a second adjacent track interference cancellation (ATIC) circuit configured to:
receive sample values for the second track from the plurality of read heads;
receive bit values corresponding to data from the first track; and
iteratively perform ATIC on the sample values for the second track based on the bit values from the first track.

19. The apparatus of claim 18 further including:
a first data path including:
  the first ATIC circuit;
  a first detector configured to:
    detect the bit values for the first track based on the sample values for the first track;
    provide the bit values for the first track to a second ATIC circuit of a second data path;
  a first decoder configured to apply the first code rate ECC to the bit values for the first track;
the second data path including:
  the second ATIC circuit further configured to iteratively perform ATIC on sample values for the second track based on the bit values for the first track from the first detector;
  a second detector configured to:
    detect the bit values for the second track based on the sample values for the second track;
    provide the bit values for the second track to the first ATIC circuit; and
  a second decoder configured to apply the second code rate ECC to the bit values for the second track.

20. The apparatus of claim 19 further including:
the first code rate ECC is equal to the second code rate ECC.

* * * * *